United States Patent [19]

Nelson et al.

[11] Patent Number: 4,561,285

[45] Date of Patent: Dec. 31, 1985

[54] THERMALLY ISOLATED CALIBRATION APPARATUS

[75] Inventors: Craig E. Nelson; Marvin L. Strenge, both of Seattle, Wash.

[73] Assignee: TAB Leasing, Seattle, Wash.

[21] Appl. No.: 650,805

[22] Filed: Sep. 14, 1984

[51] Int. Cl.⁴ .............................................. G01H 25/00
[52] U.S. Cl. ...................................... 73/1 B; 73/1 DV
[58] Field of Search ...................... 73/1 R, 1 B, 1 DV; 336/59; 335/219, 294

[56] References Cited

U.S. PATENT DOCUMENTS

| | | | |
|---|---|---|---|
| 1,731,894 | 10/1929 | Frisch | 336/59 |
| 2,184,199 | 12/1939 | Stephan | 335/294 |
| 2,729,094 | 1/1956 | Piety | 73/1 DV |
| 4,156,361 | 5/1979 | Melcher | 73/1 B |

*Primary Examiner*—S. Clement Swisher
*Attorney, Agent, or Firm*—Christensen, O'Connor, Johnson & Kindness

[57] ABSTRACT

An apparatus for calibrating a force measuring instrument of the type that includes a force sensitive element submerged in a liquid. The apparatus comprises a magnetic object having a known weight when submerged in the liquid, and an electromagnet. The electromagnet includes a core having a first end that extends beneath the surface of the liquid to a position near the upper surface of the force sensitive element. The electromagnet further includes a coil surrounding a portion of the core, means for energizing and deenergizing the coil, and a thermal insulator surrounding the first end of the core to prevent the core from contacting the liquid and to limit heat flow from the core into the liquid. When the coil is energized, the magnetic object is picked up from the force sensitive element and adheres to the insulator. When the electromagnet is deenergized, the magnetic object falls back onto the force sensitive element for calibration of the instrument. The means for energizing and deenergizing the coil may comprise a pulse generator for producing a high current surge of short duration to lift the weight up off of the force sensitive element, and a power supply for producing a lower, steady current for holding the weight against the insulator.

6 Claims, 4 Drawing Figures

THERMALLY ISOLATED CALIBRATION APPARATUS

FIELD OF THE INVENTION

The present invention relates to the calibration of force measuring instruments and, in particular, to the calibration of a force measuring instrument that includes a force sensitive element submerged in a liquid.

BACKGROUND OF THE INVENTION

The most common technique for calibrating a force measuring instrument, such as a balance or scale, involves placing a known weight on the weighing platform or balance pan and noting the response of the instrument. Although this method is simple and easy to implement, it frequently requires a considerable amount of operator time. Furthermore, if the weight being used for calibration is very small, not only will the time required per measurement be long, but many measurements may have to be averaged to provide an accurate calibration. These problems are aggravated if the force measuring device is designed to operate with its force sensitive element submerged in a liquid, as is the case when acoustic wave power is to be measured by observing the force exerted by the acoustic wave on an absorbing or reflecting target.

SUMMARY OF THE INVENTION

The present invention provides an apparatus for calibrating a force measuring instrument of the type that includes a force sensitive element submerged in a liquid. The apparatus comprises a magnetic object having a known weight when submerged in the liquid, and an electromagnet. The electromagnet includes a core of magnetic material that includes a first end extending beneath the surface of the liquid to a position adjacent the upper surface of the force sensitive element. The electromagnet further comprises a coil surrounding a portion of the core, means for energizing and deenergizing the coil, and a thermal insulator surrounding the first end of the core. The insulator prevents the core from contacting the liquid, and limits the flow of heat from the first end of the core into the liquid. The strength and position of the electromagnet is selected such that when the coil is energized, the magnetic object is picked up from the force sensitive element and adheres to the insulator, and such that when the electromagnet is deenergized, the magnetic object falls back onto the force sensitive element for calibration of the instrument. In a preferred embodiment, the means for energizing and deenergizing the coil comprises a pulse generator for producing a high current surge of short duration, and a power supply for producing a lower steady current.

DETAILED DESCRIPTION OF THE DRAWINGS

Figure 1:
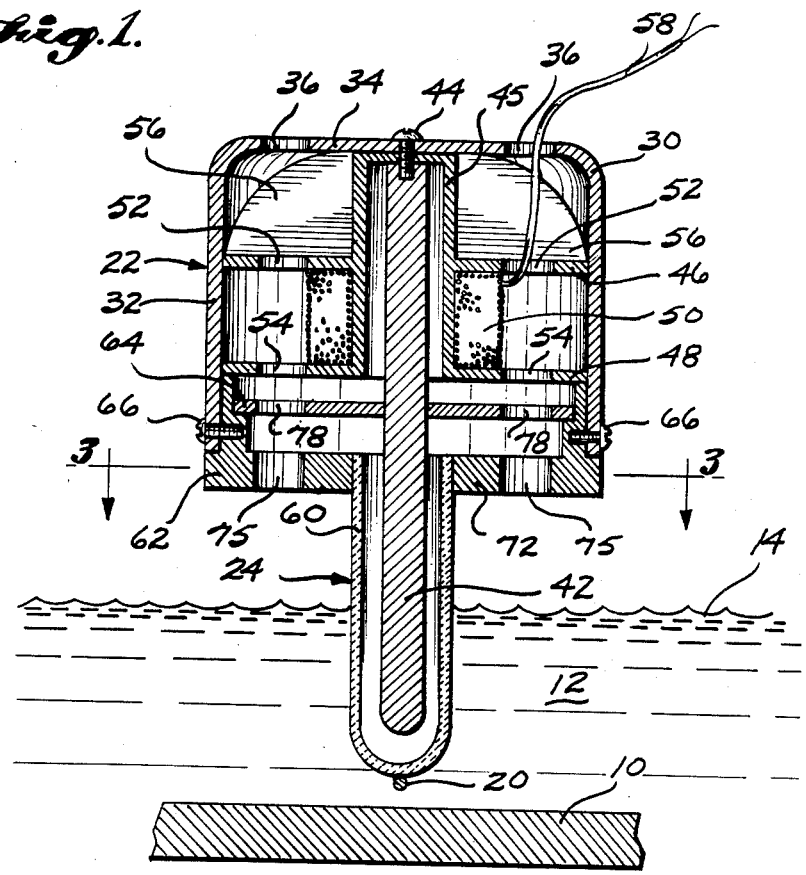
FIG. 1 is a cross-sectional view of a preferred embodiment of the calibration apparatus of the present invention.

Referring initially to FIG. 1, platform 10 represents the force sensitive element of a force measuring instrument. Platform 10 is submerged in liquid 12, the surface of liquid 12 being indicated by numeral 14. An example of an instrument that includes a force sensitive element submerged in a liquid is the apparatus for measuring the power of acoustic radiation described in U.S. patent application Ser. No. 650,819, filed Sept. 14, 1984, invented by Craig E. Nelson, entitled APPARATUS FOR MEASURING THE POWER OF ACOUSTIC RADIATION.

The apparatus of the present invention comprises ferrous weight 20 and electromagnet 22. Electromagnet 22 includes a depending arm 24 that extends beneath surface 14 of liquid 12 to a point near platform 10. During normal operation of the force measuring instrument, electromagnet 22 is energized to a degree sufficient to hold weight 20 against the lower surface of arm 24. When it is desired to calibrate the force measuring instrument, electromagnet 22 is deenergized, such that weight 20 falls onto platform 10. The effective weight (weight less buoyancy) of weight 20 in liquid 12 is known, and the force measuring instrument may therefore be calibrated by determining the response of the instrument to weight 20 on platform 10. After calibration is complete, electromagnet 22 is reenergized such that weight 20 is picked up from platform 10 and returned to the position shown in FIG. 1. Because weight 20 is the only moving part, the apparatus of the present invention minimizes the generation of fluid currents in liquid 12 that could exert forces on platform 10 and adversely affect the accuracy of the calibration process.

Figure 2:
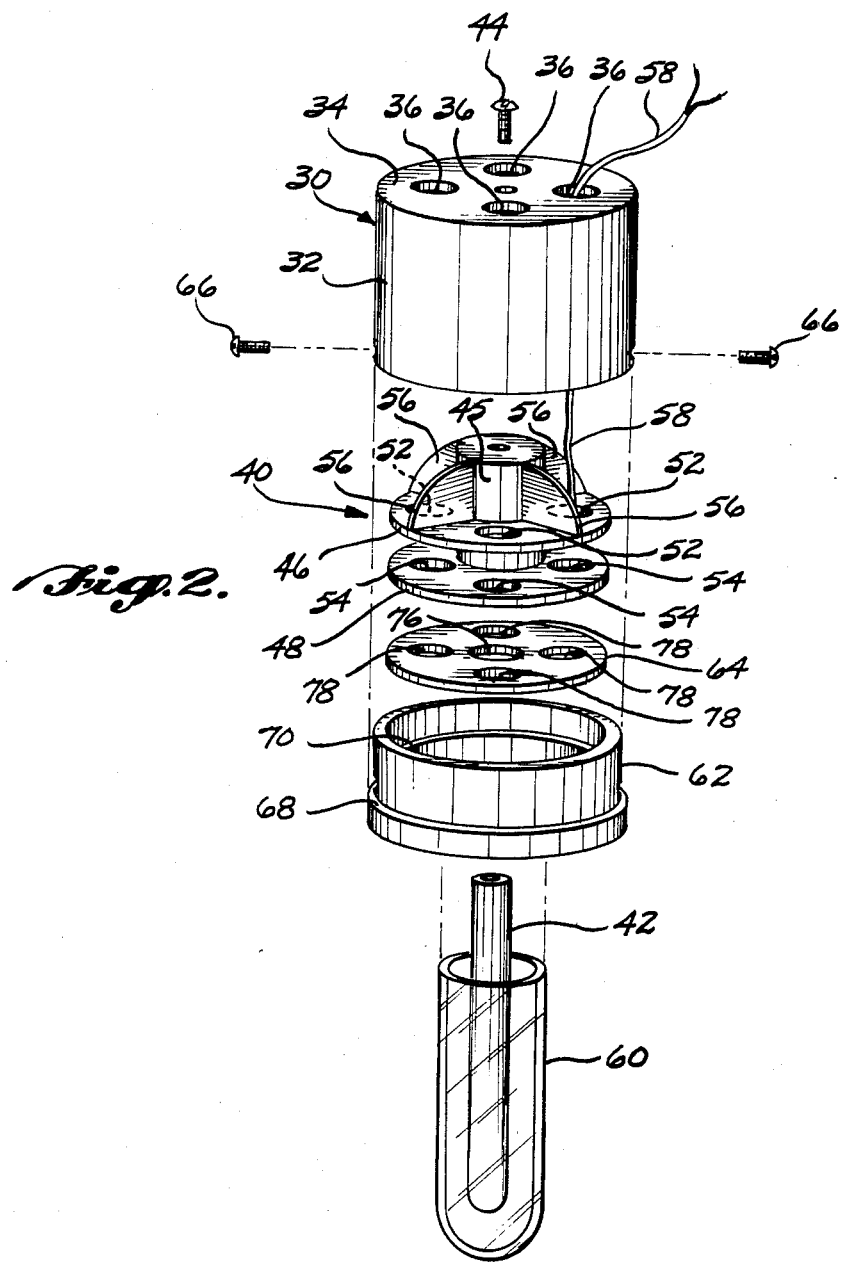
FIG. 2 is an exploded perspective view of the apparatus of FIG. 1.

Referring now to FIGS. 1 and 2, electromagnet 22 comprises housing 30 from which metal coil support 40 and ferrous metal rod 42 are supported by screw 44. Housing 30 includes tubular sidewall 32 and top wall 34, the housing having the general shape of an inverted cup. Top wall 34 includes ventilation openings 36. Coil support 40 includes tubular member 45, upper flange 46 and lower flange 48. Upper flange 46 and lower flange 48 include respective ventilation openings 52 and 54. Coil support 40 further includes cooling fins 56 extending outward and upward, respectively, from tubular member 45 and upper flange 46. Coil 50 of the electromagnet is wound on tubular member 45 between upper flange 46 and lower flange 48. The coil is connected to a suitable source of electrical power by wire pair 58 that passes through one of openings 36 in housing 30 and one of openings 52 in upper flange 46. Rod 42 and coil support 40 are in contact with one another only at their upper ends where they are attached to the housing. The outer edges of the upper and lower flanges contact housing 30 to facilitate the flow of heat from the coil support to the housing, as described below.

Figure 3:
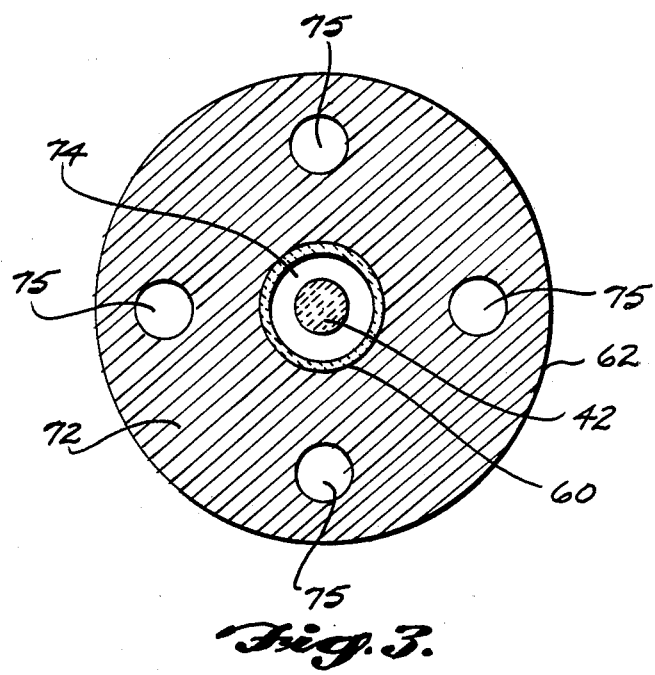
FIG. 3 is a section taken along the line 3—3 of FIG. 1.

Electromagnet 22 also includes thermal insulator 60, plastic bottom cap 62, and metal heat shield 64. Bottom cap 62 includes a generally tubular member having outer shoulder 68 and inner shoulder 70. As indicated in FIG. 3, bottom cap 62 further comprises radial member 72 containing central opening 74 and peripheral openings 75. Bottom cap 62 is secured to the lower end of housing 30 by screws 66, such that outer shoulder 68 abuts the lower edge of housing 30, as illustrated in FIG. 1. Insulator 60 is an elongated, tubular member closed at its bottom end and open at its top end. As indicated in FIG. 1, insulator 60 encloses but does not contact rod 42. The upper, open end of insulator 60 is secured in central opening 74 of bottom cap 62, such that air can pass from the interior of the insulator to the space above radial member 72. Insulator 60 is composed of a thermally insulating material and, if required, may comprise a dewar flask.

Heat shield 64 comprises a metal disk having central opening 76 and peripheral openings 78. Central opening 76 is dimensioned such that rod 42 is received within opening 76 with a sliding fit, such that the rod and heat shield make good thermal contact, and such that the heat shield prevents side-to-side motion of the rod. The function of peripheral openings 78 is ventilation. The outer edge of heat shield 64 is supported on inner shoulder 70 of bottom cap 62.

The apparatus of the present invention is particularly suited to instruments designed to measure very small forces, such as instruments used to measure the power of acoustic radiation. In such instruments, the heat generated by electromagnet 22 must be prevented from reaching liquid 12, so as to prevent thermal currents in the liquid from exerting forces on platform 10. In the illustrated embodiment, heat developed in coil 50 is provided with an easy heat conduction path to housing 30 and to the atmosphere, and numerous barriers are provided to prevent such heat from reaching liquid 12. In particular, heat generated in coils 50 is first conducted by metal coil support 40 upward and outward towards housing 30 through upper flange 46, lower flange 48 and cooling fins 56, as well as directly through core 45 at its upper point of contact with the housing. Openings 52 and 54 further facilitate this heat flow process. Heat attempting to pass directly into rod 42 must cross an air gap which provides a significant degree of heat insulation. Heat that does cross the air gap and passes into the metal rod is conducted upward to the metal housing. Heat conducted downward through the rod is taken from the rod and conducted outward by heat shield 54. This heat conduction process is facilitated by the large area of heat shield 64 and by peripheral openings 78 therein. Any heat that does pass down rod 42 past heat shield 64 must cross another air gap to reach insulator 60, and must then pass through insulator 60 to reach liquid 12 and affect the calibration process.

Figure 4:
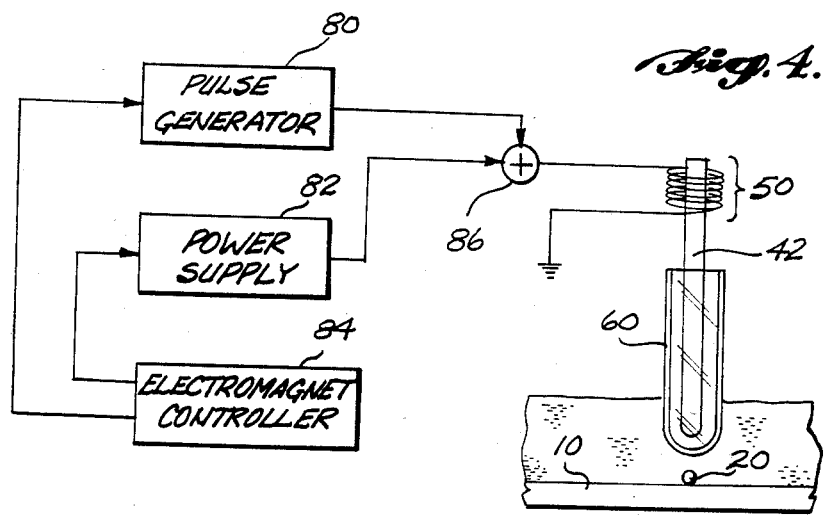
FIG. 4 is a block diagram of the electrical circuit for controlling the electromagnet.

Referring now to FIG. 4, the means for energizing and deenergizing coil 50 comprises two electrical current sources, pulse generator 80 and power supply 82, whose outputs are combined at summing junction 86 and then applied to coil 50. Pulse generator 80 and power supply 82 operate under the control of electromagnet controller 84. Electromagnet controller 84 may comprise a switch adapted for manual actuation by an operator, or a computer or other control device for automatically calibrating the force measuring instrument. In either case, whenever weight 20 is to be lifted from platform 10, electromagnet controller 84 provides suitable trigger signals to pulse generator 80 and power supply 82. Pulse generator 80 responds by providing a high surge of current that passes through summing junction 86 to coil 50. At the same time, power supply 82 provides a lower current signal that also passes through summing junction 86 to coil 50. The high current surge by pulse generator 80 provides sufficient magnetic force to lift weight 20 off platform 10 and to cause the weight to rise and adhere to the bottom of insulator 60. Subsequently, the current supplied by pulse generator 80 drops to zero, and the current provided to coil 50 is the lower current supplied by power supply 82. By such means, the high current initially required to lift the weight is provided for only as long as needed. Once the weight has been lifted, the high current provided by pulse generator 80 is extinguished, and the lower current of power supply 82 is provided for as long as it is necessary to suspend the weight above platform 10. Since the heat generated in coil 50 is proportional to the current, the combination of a high, short lifting current with a lower, continuous current further assists in preventing heat from reaching liquid 12. When the force measuring instrument is to be calibrated again, electromagnet controller 84 sends a signal to power supply 82 that extinguishes the power supply current, deenergizing the electromagnet and permitting weight 20 to fall onto platform 10.

While the preferred embodiments of the invention have been illustrated and described, it should be understood that variations will be apparent to those skilled in the art. For example, it may be desirable to use an insulating material in place of an air gap at one or more locations within the electromagnet. Use of such insulating materials would decrease the heat flow at those locations due to heat convection. Accordingly, the invention is not to be limited to the specific embodiments illustrated and described, and the true scope and spirit of the invention are to be determined by reference to the appended claims.

The embodiments of the invention in which an exclusive property or privilege is claimed are defined as follows:

1. An apparatus for calibrating a force measuring instrument that includes a force sensitive element submerged in a liquid, the apparatus comprising:
   a magnetic object having a known weight when submerged in the liquid; and
   an electromagnet comprising a core of magnetic material that includes a first end extending beneath the surface of the liquid to a position adjacent the upper surface of the force sensitive element, a coil surrounding a portion of the core, for energizing and deenergizing the coil, and a thermal insulator surrounding the first end of the core such that the core does not contact the liquid and such that flow of heat from the first end into the liquid is limited, the strength and position of the electromagnet being such that when the coil is energized, the magnetic object is picked up from the force sensitive element and adheres to the insulator, and such that when the electromagnet is deenergized, the magnetic object falls back onto the force sensitive element.

2. The apparatus of claim 1, wherein the core includes a second end and opposite said first end, and wherein the electromagnet comprises a housing having sidewalls and a top wall, the core being connected at its second end to the top wall of the housing such that the core depends from the top wall of the housing.

3. The apparatus of claim 2, wherein the electromagnet further comprises a metal coil support attached to and depending from the top wall of the housing, and wherein the coil is mounted on the coil support.

4. The apparatus of claim 3, further comprising a metal heat shield positioned beneath the coil and connected to the core.

5. The apparatus of claim 4, further comprising a bottom cap secured to and partially closing the bottom end of the housing, the insulator being secured to and depending from the bottom cap.

6. The apparatus of claim 1, wherein the means for energizing and deenergizing the coil comprises a pulse generator for producing a high current surge of short duration and a power supply for producing a lower, steady current.

* * * * *

UNITED STATES PATENT AND TRADEMARK OFFICE
CERTIFICATE OF CORRECTION

PATENT NO. : 4,561,285
DATED : December 31, 1985
INVENTOR(S) : Nelson et al.

It is certified that error appears in the above-identified patent and that said Letters Patent is hereby corrected as shown below:

Column 3, line 56, "providng" should be --providing--

Column 4, line 36, insert --means-- before "for"

Signed and Sealed this

Fifteenth Day of April 1986

[SEAL]

Attest:

Attesting Officer

DONALD J. QUIGG

Commissioner of Patents and Trademarks